United States Patent
Wigren

(10) Patent No.: US 9,234,959 B2
(45) Date of Patent: Jan. 12, 2016

(54) METHODS AND ARRANGEMENTS FOR FINGERPRINTING POSITIONING

(75) Inventor: Karl Torbjörn Wigren, Uppsala (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 1033 days.

(21) Appl. No.: 13/140,238

(22) PCT Filed: May 7, 2009

(86) PCT No.: PCT/EP2009/055523
§ 371 (c)(1),
(2), (4) Date: Jun. 16, 2011

(87) PCT Pub. No.: WO2010/069613
PCT Pub. Date: Jun. 24, 2010

(65) Prior Publication Data
US 2011/0250905 A1    Oct. 13, 2011

Related U.S. Application Data

(60) Provisional application No. 61/138,279, filed on Dec. 17, 2008.

(51) Int. Cl.
*G01S 5/14* (2006.01)
*G01S 5/02* (2010.01)

(52) U.S. Cl.
CPC . *G01S 5/14* (2013.01); *G01S 5/021* (2013.01); *G01S 5/0252* (2013.01)

(58) Field of Classification Search
CPC ....... H04W 4/02; H04W 64/00; H04W 24/00; H04W 36/32; H04W 4/021; H04W 64/003; G01S 5/0263; G01S 5/10; G01S 5/009; G01S 5/0242; G01S 5/0252; G01S 5/14; G01S 5/021; H04M 1/72572; H04M 2250/10

USPC ................. 455/404.2, 418, 440, 456.1, 456.3
See application file for complete search history.

(56) References Cited

U.S. PATENT DOCUMENTS

| | | | |
|---|---|---|---|
| 6,329,948 B1 | 12/2001 | Ishikawa | |
| 6,865,395 B2 | 3/2005 | Riley | |
| 2009/0117907 A1 * | 5/2009 | Wigren | ......................... 455/440 |

FOREIGN PATENT DOCUMENTS

| | | | | |
|---|---|---|---|---|
| WO | WO 2007/043915 A1 * | 4/2007 | ............... H04Q 7/38 |
| WO | 2008/118052 A1 | 10/2008 | |

OTHER PUBLICATIONS

Wigren T., "Adaptive Enhanced Cell-ID Fingerprinting Localization by Clustering of Precise Position Measurements", IEEE Transactions on Vehicular Technology, Sep. 2007, pp. 3199-3209, vol. 56, No. 5.

*Primary Examiner* — Dinh P Nguyen
(74) *Attorney, Agent, or Firm* — Coats & Bennett, PLLC

(57) ABSTRACT

A method for providing position determination assisting data comprises repetitions of establishing (210) of a cell relation configuration for a user equipment and performing (212) of a high-precision position determination for the user equipment. Results of the determinations belonging to the same cell relation configuration are clustered (214) in separate clustered results. An area definition is associated (220) with the clustered results by enclosing (221) the clustered results by a polygon, shrinking (222) the polygon by moving corners towards a contraction point and defining (223) the area definition as a shrunk polygon comprising a predetermined fraction of the clustered results. The contraction point is selected to be situated within the clustered results. The method also comprises creating (230) of position determination assisting data comprising a relation between the cell relation configurations and the associated area definitions. An arrangement for providing position determination assisting data is also presented.

12 Claims, 5 Drawing Sheets

METHODS AND ARRANGEMENTS FOR FINGERPRINTING POSITIONING

TECHNICAL FIELD

The present invention relates in general to positioning or location based services in different network architectures.

BACKGROUND

The possibility to determine the position of a mobile device has enabled application developers and wireless network operators to provide location based, and location aware, services. Examples of those are guiding systems, shopping assistance, friend finder, presence services, community and communication services and other information services giving the mobile user information about their surroundings.

In addition to the commercial services, the governments in several countries have put requirements on the network operators to be able to determine the position of an emergency call. For instance, the governmental requirements in the USA (FCC E911) state that it must be possible to determine the position of a certain percentage of all emergency calls. The requirements make no difference between indoor and outdoor environment.

In outdoor environments, the position estimation can be done using e.g. the global positioning system, i.e. GPS (Global Positioning System), or methods based thereon, such as Assisted-GPS (A-GPS). However, this requires that the user equipment has to be provided with additional functionalities concerning e.g. reception of radio signals.

Position estimation can also be performed using the wireless network itself. Methods using the wireless network can be grouped in different groups. A first group comprises methods that are based on the identification of the radio cell to which a mobile terminal is attached, e.g. by using Cell-ID. In its simplest form, a user equipment (UE) is known to be situated within the coverage area of a certain base station if the user equipment is communicating with the wireless network through that base station. This can be improved by also taking information from so-called neighbor lists into account. However, the accuracy is even then not very impressive.

Another group of position estimation methods are based on measurements of signal propagation times or quantities related thereto. Timing Advance (TA) in LTE systems and Round Trip Time (RTT) in WCDMA systems are examples of such methods. Briefly, the travel time of radio waves from the Radio Base Station (RBS) to the UE and back is measured. The round trip time measurement alone defines a circle, or if the inaccuracy is accounted for, a circular strip around the RBS, within which the UE is located. By combining such information with propagation times to neighboring RBS's enabling trilatheration calculations, the accuracy can be improved somewhat. However, this possibility does only occur in a limited part of the cells, typically less than 25%. The signal propagation time measurements can also be combined with Cell-ID information, which typically restricts the area in which the UE can be situated to the sector of the circular strip being situated within the cell. As for other terrestrial positioning methods, like observed time difference of arrival (OTDOA), these suffer from a too low detection performance to provide good enough performance, at least in the basic configuration.

A more promising approach is provided by so called fingerprinting positioning, see e.g. "Adaptive enhanced cell-ID fingerprinting localization by clustering of precise position measurement", in IEEE Trans. Vehicular Tech., vol. 56, no. 5, 2007, pp. 3199-3209 by T. Wigren. Fingerprinting positioning algorithms operate by creating a radio fingerprint for each point of a fine coordinate grid that covers the Radio Access Network (RAN). The fingerprint may e.g. consist of detectable cell ID's, quantized path loss or signal strength measurements, quantized RTT or TA, quantized noise rise, radio connection information like the radio access bearer (RAB) and/or quantized time.

When providing position determination assisting data in a cellular communications network necessary for adaptive enhanced cell ID (AECID) positioning, a cell relation configuration is established for a user equipment, for which a tag is created, and a high-precision position determination is performed for the same user equipment. This is repeated a plurality of times. A second step is to collect all high precision positioning measurements that have the same tag in separate high precision measurement clusters. In a third step, a polygon that represents the geographical extension of a cluster is computed, for each stored high precision position measurement cluster. The details of this algorithm are disclosed in the published international patent applications WO 2007/043915, WO 2008/118052 and WO 2008/069712. The area of the polygon is typically minimized, which in turn maximizes the accuracy when used. The probability that the terminal is within the polygon, i.e. the confidence, is precisely known as it is set as a constraint in the algorithm. The typical approach to this is to create a polygon that is known to enclose all clustered measurements of the tag to be treated. A contraction point is selected within that polygon and the polygon is shrunk according to different algorithms towards that contraction point, under the constraint that a certain fraction of all clustered measurements are maintained within the polygon, until a minimum area of the polygon is obtained.

When a positioning is to be performed, a fingerprint is detected and compared with stored relations between fingerprints and position. In such a way, an area within which the UE with a certain certainty is situated can be achieved.

However, it has been found that the present routines for the fingerprinting technology do not operate optimally in certain cases. It has been found that the polygon shrinking procedures in some occasions find local minima of the area instead of a more global minimum.

There is hence a need for methods and apparatuses further improving the positioning accuracies by finding improved polygon shrinking routines or alternatives to the polygon shrinking routines.

BRIEF DESCRIPTION OF THE DRAWINGS

The invention, together with further objects and advantages thereof, may best be understood by making reference to the following description taken together with the accompanying drawings, in which.

SUMMARY

Figure 1:
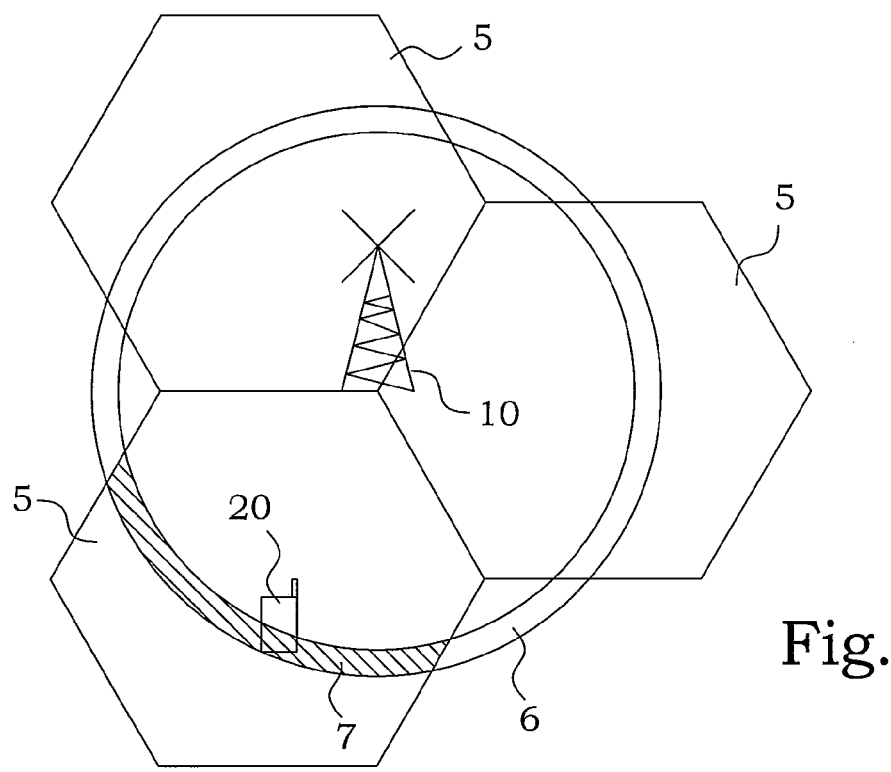
FIG. 1 is a schematic drawing illustrating the function of RTT positioning.

An object of the present invention is to provide methods and arrangements operating according to improved polygon shrinking procedures. The above object is achieved by methods and arrangements according to the enclosed independent patent claims. Different preferred embodiments are achieved by methods and arrangements according to the enclosed dependent patent claims. In general words, according to a first aspect, a method for providing position determination assisting data in a cellular communications network comprises establishing of a cell relation configuration for a user equipment and performing of a high-precision position determination for the user equipment. The establishing and performing are repeated a plurality of times. Results of the high-precision position determinations belonging to the same cell relation configuration are clustered in separate clustered results. An area definition is associated with at least one of the clustered results by enclosing the clustered results by a polygon, shrinking the polygon by moving polygon corners towards a contraction point and defining the area definition as a shrunk polygon comprising a predetermined fraction of the clustered results. The contraction point is always selected to be situated in the interior of the clustered results. The method also comprises creating of position determination assisting data comprising a relation between the cell relation configurations and the associated area definitions.

According to a second aspect, a method for radio network planning comprises obtaining of position determination assisting data provided according to the first aspect and evaluating of the position determination assisting data regarding actual radio propagation. The performing of a high-precision position determination is performed on demand.

According to a third aspect, a method for determining a position of a user equipment in a cellular communications network comprises obtaining of position determination assisting data provided according to the first aspect, establishing a cell relation configuration for the user equipment and determining, by the position determination assisting data, of an area definition related to the cell relation configuration as defining an area in which the user equipment is positioned.

According to a fourth aspect, an arrangement for providing position determination assisting data related to a cellular communications network comprises a configuration-establisher arranged for establishing a cell relation configuration for a user equipment, a data-obtainer arranged for obtaining data of a high-precision position determination for said user equipment. The arrangement further comprises a clusterer connected to the configuration-establisher and the data-obtainer. The clusterer is arranged for clustering results of the high-precision position determinations belonging to the same cell relation configuration in separate clustered results. The arrangement further comprises an associator connected to the clusterer. The associator is arranged for associating an area definition with at least one of the clustered results and creating position determination assisting data comprising a relation between the cell relation configurations and the associated area definitions. The associator is further arranged for enclosing the clustered results by a polygon, shrinking the polygon by moving polygon corners towards a contraction point, and defining the area definition as a shrunk polygon comprising a predetermined fraction of the clustered results.

The associator is further arranged for selecting the contraction point always to be situated in the interior of the clustered results.

According to a fifth aspect, an arrangement for determining a position of a user equipment in a cellular communications network comprises an arrangement arranged for providing position determination assisting data according to the fourth aspect. The arrangement further comprises a configuration-establisher arranged for establishing a cell relation configuration for the user equipment. The arrangement also comprises a position-determiner connected to the arrangement arranged for providing position determination assisting data and the configuration-establisher. The position-determiner is arranged for determining, by the position determination assisting data, an area definition related to the cell relation configuration as defining an area in which the user equipment is positioned.

According to a sixth aspect, a node of a cellular communications network comprises an arrangement according to the fifth aspect.

According to a seventh aspect, a cellular communications network comprises an arrangement according to the fifth aspect.

According to an eighth aspect, a node comprises an arrangement according to the fifth aspect. The configuration-establisher and said data-obtainer comprise a receiver arranged for receiving data from a cellular communications network.

One advantage of the present invention is that it improves the positioning accuracy for the AECID fingerprinting positioning method. In particular, the present invention presents ways to achieve a contraction point that is situated in the interior of the cluster, a necessity for the successful operation of the AECID positioning method in some applications. In other words, compared to prior art solutions, the contraction point is moved to compute an area so that the point of contraction is situated in the interior of the cluster.

DETAILED DESCRIPTION

Throughout the drawings, the same reference numbers are used for similar or corresponding elements.

The present invention is enabled by the insight that the encountered problems with non-optimum shrinkage of the polygons at least to apart was caused by the shape of the clustered measurements. For instance, in situations, where the clustered measurements covered an area that was elongated and curved, the total centre of gravity of all the clustered measurements could be situated outside the actual cluster. This follows since the AECID algorithm computes a polygon that describes the region in question. The polygon is calculated by polygon corners being forced to move towards the center of gravity of a cluster of high precision position reference measurements. The problem now manifests itself in that the center of gravity, e.g. due to the curvature of the strip and cluster may fall outside the cluster, e.g. if the cluster is in the shape of a circular strip, closer to the base station. The consequence is poor performance since the polygon corners cannot converge to the boundary of the actual cluster Since also elongated and curved cluster shapes thus are possible to handle, the present invention thus enables accurate AECID polygon computation in e.g. the case where the radio fingerprints are based on Timing Advance (TA) measurements in GSM, Round Trip Time (RTT) measurement in WCDMA, TA measurements in LTE or additional time measurements in LTE.

The problem solved originates from the fact that TA and RTT measurements all determine the distance between the base station and the terminal or user equipment. These methods hence determine the terminal position to be within a circular strip at the measured distance from the base station. The thickness of the strip corresponds to the measurement uncertainty and left and right limiting angles follow from the extension of the cell.

It can now be understood that the circular strips will be very wide and thin, and possess a significant curvature, when the distance between the base station and the terminal becomes large. This is now possible to handle according to the present invention.

The present invention solves the above problem by a novel computation of another contraction center point, towards which the polygon corners are made to converge. The details are elaborated further below.

In order to further appreciate the advantages with the present invention, positioning by TA and RTT methods will first be described somewhat more in detail. Then, an overview of the AECID fingerprinting positioning methods is given.

Timing Advance (TA) or Round Trip Time (RTT) are two examples of methods based on measurements of propagation times of signals within a wireless network. The round trip time measurement principle is depicted in FIG. 1. Briefly, the travel time of radio waves from the RBS 10 to the UE 20 and back is measured. The distance from the RBS 10 to the UE 20 then follows from the formula:

$$r = c\frac{RTT}{2}, \quad (1)$$

where RTT is the round trip time and where c is the speed of light. In (1) any signal latency in the UE is assumed to be compensated for so that RTT represents the true travel time of the radio waves. This defines a circular strip 6. By combining this information with the cell polygon 5, left and right limiting angles of the circular strip 6 can be computed, within which sector arc 7 the UE 20 is situated.

In several systems, among these the Wideband Code Division Multiple Access (WCDMA) system, Round Trip Time (RTT) can therefore be used to identify the distance from the antenna at which a UE is positioned. This provides only a distance and is not possible to ascertain where in the circle or sector around the antenna the UE is. If for example the RTT measurements determine that the UE is 500 m from the base station, this positioning is along an arc in a sector 7 or the circumference of a circle.

Trilatheration measurements of RTT from several base stations can be used to increase accuracy. However, this possibility is limited by the fact that the terminal needs to be in handover with more than one base station for this to be possible, i.e. in soft(er) handover. This does only occur in a limited part of the cells, typically less than 25%. Hence multi-leg RTT in WCDMA will not have a good availability.

AECID fingerprinting positioning is a fingerprinting positioning technology that refines the basic fingerprinting methods in a variety of ways. A first recent international patent application (WO 2007/043915) discloses the main ideas of the positioning approach. The present disclosure is written with the information of this as a starting point.

The AECID positioning method is based on the idea that high precision positioning measurements, e.g. A-GPS measurements, can be seen as points that belong to regions where certain cellular radio propagation condition persist. In its simplest form A-GPS measurements that are performed at the same time as a certain cell ID is valid represent A-GPS measurements that fall within a specific cell of a cellular system. The AECID positioning method recognizes this and introduces a fingerprint or tagging of high precision measurements according to certain criteria.

The fingerprint or tag may e.g. comprise the cell IDs that are detected by the terminal. It may also comprise quantized path loss or signal strength measurements, with respect to multiple RBS's, performed by the terminal. Note that an associated ID of the RBS may advantageously also be needed. A quantized Round Trip Time in each grid point can also be a part of a fingerprint or tag. Note that also here an associated ID of the RBS is of benefit. A further parameter possible to use in a fingerprint or tag is quantized noise rise. This quantity represents the load of a CDMA system. Furthermore, radio connection information like the radio access bearer (RAB) or the quantized time can also be used in the fingerprint or tag.

The AECID method also needs reference positions. These reference positions are high precision position measurements of opportunity, and fingerprinting radio measurements are then achieved for those points. This requires that algorithms for clustering of high precision position measurements of opportunity are defined. Furthermore, algorithms for computation of geographical descriptions of the clusters also need to be defined.

The main parts of the AECID algorithms used together with the present invention are described in detail in Appendix A. To discriminate the information from the core of the present invention, all equations available as prior art are numbered (A1), . . . .

The second step of the AECID positioning method is to collect all high precision positioning measurements that have the same tag in separate high precision measurement clusters, and to perform further processing of said cluster in order to refine it, see e.g. the published international patent application WO 2008/054272. It is clear that each such cluster consists of high precision position measurements collected from a region with similar radio conditions—hence the measurements are normally from the same well defined geographical region. More specifically, that specific geographical region is normally substantially smaller than the extension of a cell of the cellular system.

In a third step of the AECID positioning method, a tagged polygon that represents the geographical extension of a tagged cluster is computed, for each stored high precision position measurement cluster. The details of this algorithm are disclosed in the published international patent applications WO 2007/043915, WO 2008/118052 and WO 2008/069712 and are not repeated here in detail since they are assumed to be a part of the knowledge of anyone skilled in the art. One pronounced property of the algorithm comprises that the area of the polygon is minimized. In other words, the accuracy is maximized. Furthermore, the algorithm comprises that the probability that the terminal is within the polygon, i.e. the confidence, is precisely known. It is set as a constraint in the algorithm.

So far steps towards the creation of a tagged database of polygons have been described. An AECID position is now easily determined by a first determination of the persisting tag. This is performed by looking up cell ID's, by performing auxiliary measurements and by looking up auxiliary connection information, as described above. The polygon corresponding to the determined tag is then looked up in the tagged database of polygons, followed by a reporting, e.g. over the RANAP.

Figure 2:
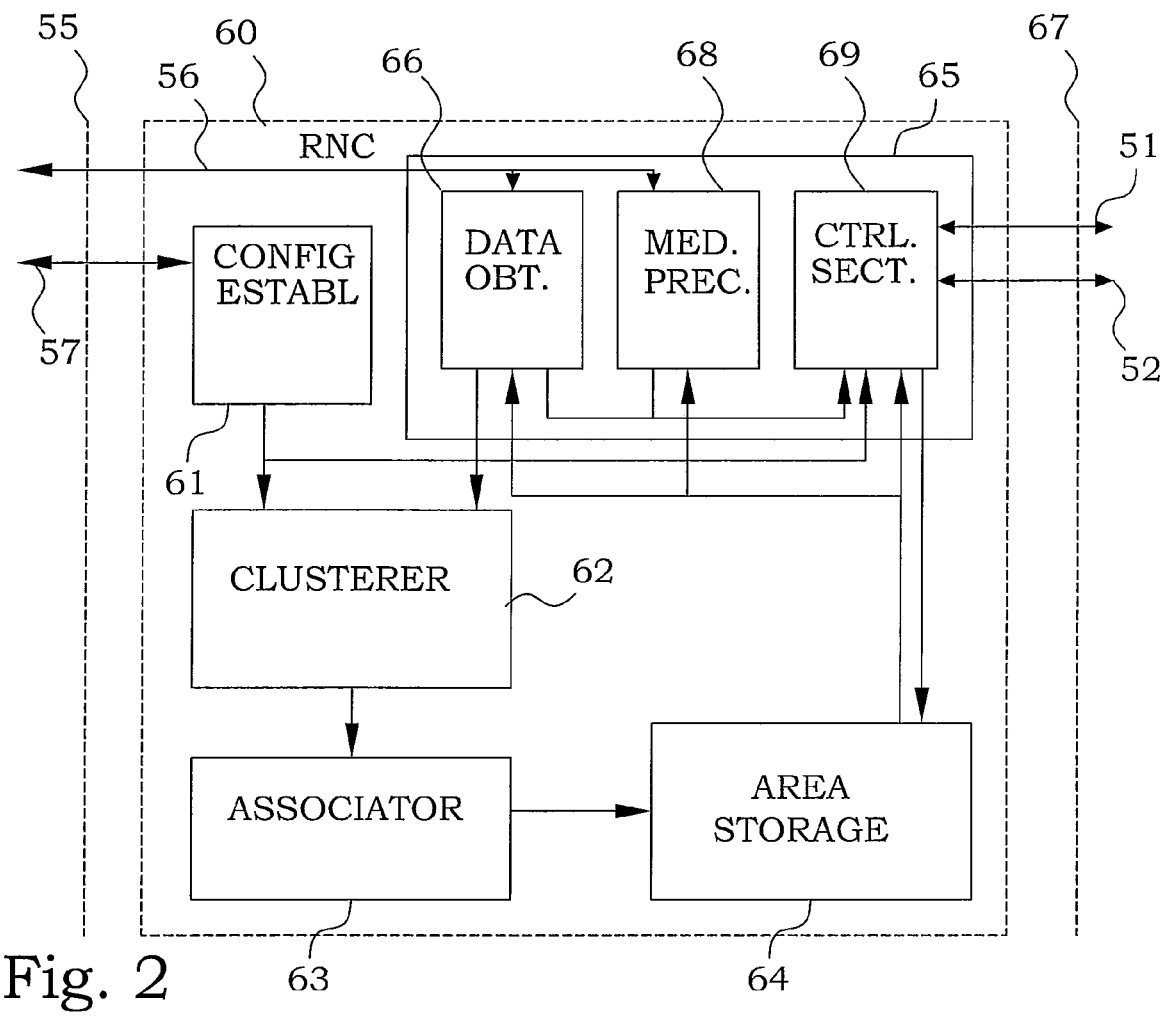
FIG. 2 is a block scheme of a node having an AECID arrangement.

FIG. 2 is a block diagram of an embodiment of a positioning node 65 based on AECID positioning. In the present embodiment, which is assumed to be comprised in a WCDMA system, such functionality is preferably comprised in the RNC 60. Another possibility is to implement the invention in the SAS node (e.g. an Ericsson SMLC) on the other side of the Iupc interface. Still another possibility is to log measurements and perform the algorithms in OSS-RC or even a completely external node. New interfaces and/or information elements in existing interfaces allowing for exchange of detected cell sets and measured high-precision position determination results may then be necessary. More alternatives are presented further below.

The RNC 60 communicates with UEs, transparently via RBSs, using the RRC interface 55. The RNC 60 comprises an arrangement for providing position determination assisting data related to the cellular communications network. In the present context, at least two information types are of interest; positioning measurements 56, in particular high-precision positioning measurements, and fingerprint or cell relation parameter measurements 57. The fingerprint parameter measurements 57 are provided to a configuration-establisher 61, also known as a fingerprint determining section. The configuration-establisher 61 is arranged for establishing a cell relation configuration, or fingerprint configuration, for a user equipment. The determined cell relation configuration of a particular user equipment is provided to a clusterer 62, also known as a clustering section. The clusterer 62 is connected to the configuration-establisher 61.

The positioning measurements 56 are provided to the positioning node 65. The high-precision positioning measurements are provided to a high-precision position data-obtainer 66, also known as a high-precision positioning section, which e.g. can comprise UTDOA or A-GPS based positioning. The data-obtainer 66 is thus arranged for obtaining data of a high-precision position determination for the user equipment. Other positioning measurements, e.g. cell ID or RTT positioning measurements are in the present embodiment provided to a medium-precision positioning section 68. The outcome of the analysis of the high-precision positioning measurements, i.e. high-precision positions is provided to the clusterer 62, where the high-precision position is associated with a corresponding cell relation configuration. The measurements are clustered depending on the cell relation configuration. In the clusterer 62 is arranged for clustering results of the high-precision position determinations belonging to the same cell relation configuration in separate clustered results.

The clusters of positions for a certain cell relation configuration are provided to an associator 63, in the form of an algorithmic block. In the associator 63, area definitions are calculated. An area that describes each cluster of measurements, at a specified confidence level, is computed in the associator 63. In the WCDMA case, the preferred area definition is a polygon defined by 3 to 15 corner coordinates. In a particular embodiment, the associator 63 provides polygons such that the probability that a given fraction of high-precision measurements of a cluster are located in the interior of the polygon. This associator 63 preferably performs repeated re-calculations of polygons, for all measurement clusters with a sufficient number of recent enough high-precision measurements. In other words, the associator 63 is connected to the clusterer 62 and arranged for associating an area definition with at least one of the clustered results and creating position determination assisting data comprising a relation between the cell relation configurations and the associated area definitions. The associator 63 is further arranged for enclosing the clustered results by a polygon, shrinking the polygon by moving polygon corners towards a centre of gravity of clustered results, and defining the area definition as a shrunk polygon comprising a predetermined fraction of the clustered results. The area definitions are provided to an area storage 64, where polygons representing a hierarchically organized set of cell relation configurations are stored. The stored polygons are then used by positioning algorithms of the system. The data structure of the stored polygons preferably contains a list of pointers covering each relevant fingerprint configuration. Each such pointer points to a corresponding 3-15 corner polygon, computed repeatedly as described above. The data structure preferably also contains a time tag for each polygon that defines the time when the polygon was computed.

When a position determination according to the principles of the present invention is requested, a cell relation configuration is determined in the configuration-establisher 61 as usual. The result is forwarded to a control section 69 in the positioning node 65. When a positioning request 51 is received, e.g. a so-called Location Reporting Control message over the RANAP interface 67, the control section 69 may, based on quality of service parameters and UE capability, request a position determination by retrieving an area definition from the area storage 64, which corresponds to the present fingerprint configuration of the UE. The achieved area definition, preferably a polygon definition is included in a positioning reporting message 52, which typically is sent back over the RANAP interface 67 using e.g. a so-called Location Report message.

AECID has also been applied with tags connected to TA and RTT measurements. In such cases certain refinements have been made. The patent application WO 2008/118052 addresses a problem of polygon computation for clusters with a high aspect ratio, i.e. with a lateral extension that is much larger than the radial one. That disclosure addresses the distribution of the initial polygon corners, and presents a corner re-sampling strategy to improve performance.

As mentioned above, since TA and RTT results determines the distance to a base station very accurately, but not the direction, the resulting areas that are associated with tags based on TA or RTT measurements are generally very wide and thin, and possess a significant curvature. With prior art AECID algorithms there are problems with the selection of the contraction point.

Figure 3:
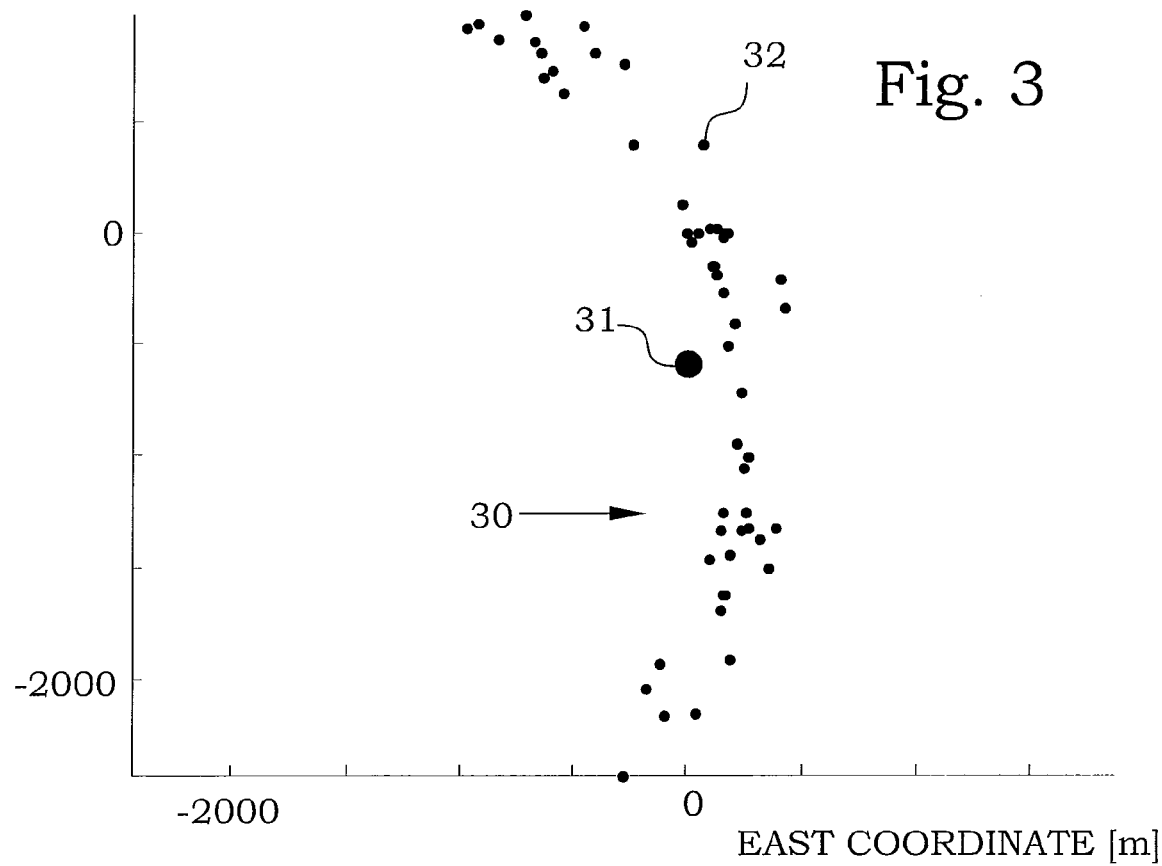
FIG. 3 is a diagram of clustered high-precision positioning measurements.

The importance of the contraction point used by the polygon computation algorithm is illustrated by FIG. 3, which shows a cluster 30 of high precision position measurements 32 corresponding to a TA- or RTT-measurement. In the diagram the global center of gravity 31 of the high precision position measurements 32 is also marked. It can here be noted that the center of gravity is not in the interior of the cluster. This in turn means that when enclosing the cluster 30 with a polygon and letting the polygon shrink by moving the polygon corners towards the global center of gravity 31, it will not be possible for the polygon corner to pass the global center of gravity 31 in order to find a better area representation.

Figure 4:
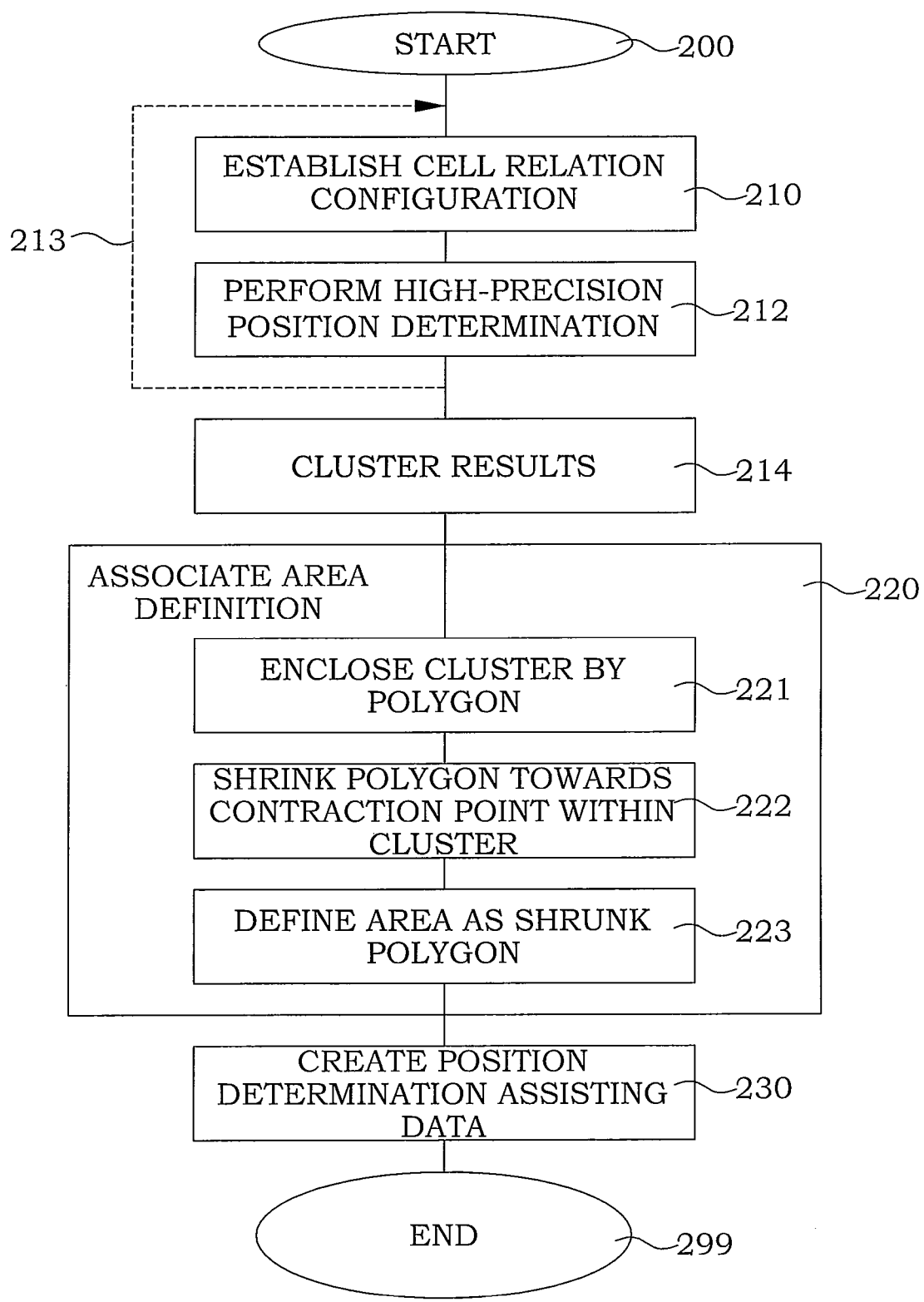
FIG. 4 is a flow diagram illustrating steps of an embodiment of a method according to the present invention.

FIG. 4 illustrates a flow diagram of steps of an embodiment of a method according to the present invention. A method for providing position determination assisting data in a cellular communications network starts in step 200. In step 210, a cell relation configuration for a user equipment is established. A high-precision position determination for the user equipment is performed in step 212. In FIG. 4, step 210 is illustrated as being performed before step 212. However, step 212 may also be performed before or concurrently, partly or entirely, as step 210. Steps 210 and 212, i.e. the establishing and performing steps, are repeated a plurality of times, as indicated by the broken arrow 213. In step 214, results of the high-precision position determinations belonging to the same cell relation configuration are clustered in separate clustered results.

In step 220, an area definition is associated with at least one of the clustered results. This step in turn comprises the steps 221, 222 and 223. In step 221, the clustered results are enclosed by a polygon. The polygon is shrunk in step 222, by moving polygon corners towards a contraction point when excluding the reference position measurement points of the cluster, one after the other, until a predetermined fraction of the original points remains. According to the present invention, the contraction point is always selected to be situated in the interior of the clustered results. At such a position, the contraction point is locally surrounded by individual clustered results. The present invention thereby provides a new method for computation of the contraction point, towards which the corners of the initial polygon contract. This can in turn be achieved in different manners, of which two particular examples will be explained more in detail below. In the first example embodiment, the selection is performed by an iterative computation of a sequence of local center of gravities. The local center of gravities is based on a subset of high precision reference points of the cluster that are closest to a previous local center of gravity of the sequence. The closeness is measured by a distance measure. In the second example embodiment, the selection is performed by optimization of a criterion function, depending of the contraction center point being computed. The criterion function reflects how interior the contraction center point is in the cluster of reference position measurement points.

Intuitively, this procedure replaces the previous center of gravity computation in prior art AECID, by an algorithm that guarantees that the contraction center point is well in the interior of the cluster of reference position measurements. This ensures good performance of the modified polygon contraction algorithm when TA and RTT measurements are exploited.

In step 223, the area definition is defined as a shrunk polygon comprising a predetermined fraction of the clustered results. Position determination assisting data comprising a relation between the cell relation configurations and the associated area definitions is created in step 230. The method ends in step 299.

The association of an area is typically performed in the previously mentioned associator (see FIG. 2). According to the present invention, such an associator is therefore further arranged for selecting the contraction point always to be situated in the interior of the clustered results, where the contraction point is locally surrounded by individual clustered results.

Figure 5:
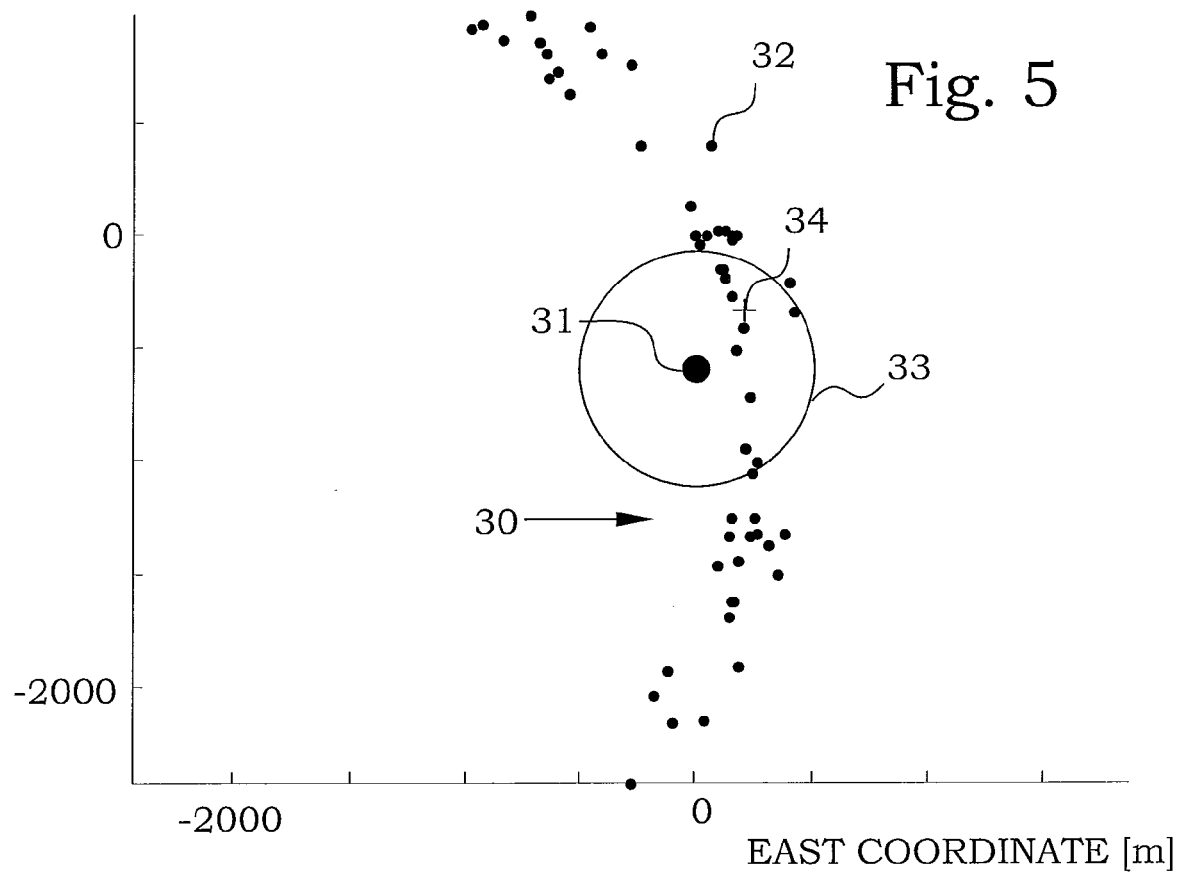
FIG. 5 is a diagram similar to FIG. 3, in which a local centre of gravity is determined.

First, the particular embodiment based on iterative local center of gravity initiation is described. This is described in connection with FIG. 5. The same cluster of results 30 as in the FIG. 3 is shown. First, the "global" center of gravity 31 is computed, just as in prior art approaches. As seen, this global center of gravity falls outside the cluster 30. Then the v % of measurement points of the cluster 30, which are closest to the global center of gravity 31 are found. These are the high precision position measurements 32 situated within the circle 33. This requires in one approach a computation of the distance between the global center of gravity and each high precision position measurement 32, followed by a search for the v % closest high precision position measurements 32. In FIG. 5, v is selected to be 15%. Note that it is not necessary to sort these high precision position measurements 32 according to closeness, which would require a more complex algorithm. The so obtained points are the ones appearing within the circle 33.

Alternatively, these points are found by successively increasing a circular area around the global center of gravity 31 and counting the number of high precision position measurements 32 that falls within the circular area. When the fraction v % is reached, all points within the circle are selected.

A local center of gravity 34, corresponding to the high precision position measurements 32 falling within the circle 33, is then computed. It can be noted that this local center of gravity 34 is now almost always in the interior of the cluster 30.

In the present embodiment, in the shrinking step 222 of FIG. 4, the contraction point is thus selected to be a local centre of gravity of a subset of clustered results enclosed by the polygon. The subset is a predetermined amount of all clustered results enclosed by the polygon situated closest to a total centre of gravity of all clustered results enclosed by the polygon.

Likewise, in an arrangement adapted for operating according to such an embodiment, the associator (c.f. FIG. 2) is arranged for selecting the contraction point as a local centre of gravity of a subset of clustered results enclosed by said polygon. The subset is a predetermined amount of all elements of the clustered results enclosed by the polygon situated closest to a total centre of gravity of all clustered results enclosed by the polygon.

To obtain the best result, the procedure is iterated a predetermined number of times, where the new local center of gravity replaces the previously computed global center of gravity/local center of gravity, at each repetition. This is typically performed before the contracting polygon algorithms are performed. The final local center of gravity is then selected as the contraction point. In other words, the performing of the computation of the contraction point occurs before the step of shrinking the polygon begins.

As a further refinement, the process can also be performed after a predetermined number of steps of the AECID contracting polygon algorithm has been performed. Then only the high precision position measurements that are still in the interior of the polygon are used for the computation. This is the best procedure, since the overall objective of the invention is to secure that the contraction point, towards which the polygon corners contract, remain in the interior of the polygon. In other words, the computation of the contraction point is performed intermittently during the step of shrinking the polygon. In a further refined version, the step of performing a computation of the contraction point is performed only if the total centre of gravity of all clustered results enclosed by the polygon falls outside the interior of the clustered results enclosed by the polygon.

It is stressed that although the procedure may seem simple, it is of crucial importance for the successful operation of the AECID contracting polygon algorithm.

Another approach to achieve a contraction point within the cluster would be to use a criterion that ensures that the sought contraction point is located in the interior of the cluster of high precision measurement points. Such a criterion would need to make sure that there is an environment of minimum size with at least a predetermined number (>1) of high precision reference points of the cluster in the environment of the contraction point.

To formalize this, the contraction point vector is denoted:

$$r_c = (x_c, y_c)^T$$

And the corresponding environment:

$$B_{r_c}\{(xy)^T|(x-x_c)^2(y-y_c)^2\leq\delta\}$$

Here x and y denote the x- and y-coordinates of the 2 dimensional space, and where $\delta$ is a measure of the size of the environment. The criterion can then be formalized as $$V = \underset{\substack{x_c,y_c,\delta \\ \kappa(r_{HighPrecision}\in B_{r_c})=M}}{\operatorname{argmin}} B_{r_c}.$$

In the criterion $\kappa()$ counts the number of points that obeys the condition to be in the interior of the environment and M denotes the number of points (>1) required to be in the environment.

In the present embodiment, in the shrinking step 222 of FIG. 4, the contraction point is thus selected as a point within the polygon having a smallest distance to the n:th closest element of the clustered result, where n is one of a predetermined number and a predetermined fraction of all clustered results.

Likewise, in an arrangement adapted for operating according to such an embodiment, the associator (c.f. FIG. 2) is arranged for selecting the contraction point as a point within the polygon having a smallest distance to the n:th closest element of the clustered result, where n is one of a predetermined number and a predetermined fraction of all clustered results.

Note that the minimization finds both a contraction point and a minimum size of a ball around that contraction point that contain a pre-determined number of points of the cluster in its interior. Since also the size of the ball as measured by $\delta$ is minimized, it follows that the solution to the criterion minimization problem will be in the interior of the cluster.

The problem with the approach is that it requires an exhaustive search for its solution, something that is highly complex. This is the reason why the approach of the previous section is preferred.

Note also that the number of interior points M may also be varied or iterated.

As in the basic versions of the AECID, the provided position determination assisting data can be evaluated regarding actual radio propagation. The step of performing a high-precision position determination for the user equipment is then preferably performed on demand.

Figure 6:
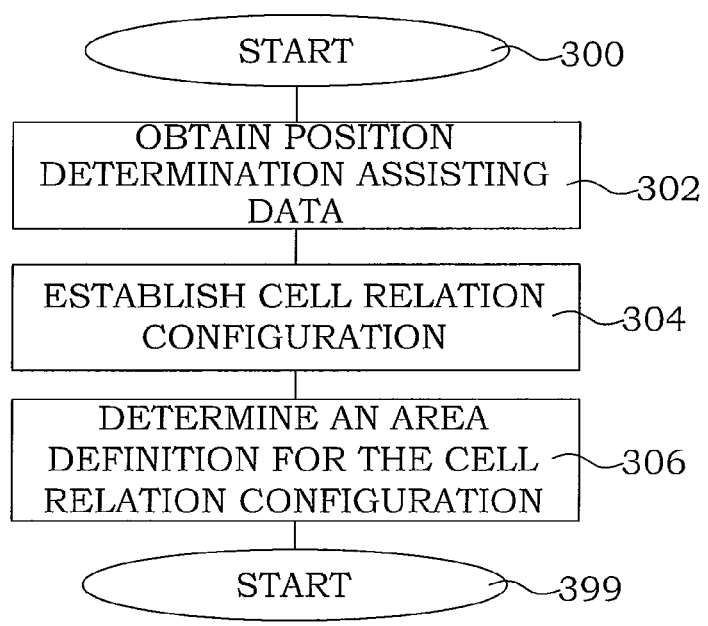
FIG. 6 is a flow diagram illustrating an embodiment of another method according to the present invention.

Another use of the position determination assisting data is of course for determining a position of a user equipment in a cellular communication network. The basic steps are illustrated by FIG. 6. The method for determining a position of a user equipment in a cellular communications network begins in step 300. In step 302, position determination assisting data is obtained, provided according to the principles described here above. In step 304 a cell relation configuration for the user equipment to be positioned is established. An area in which the user equipment is positioned is in step 306 defined as an area definition related to the established cell relation configuration. This area definition is determined using the position determination assisting data. The method ends in step 399.

The node illustrated in FIG. 2 is an RNC. However, an arrangement for providing position determination assisting data can be comprised also in other types of nodes within a cellular communications network. It is also possible to have the arrangement in a node outside the actual cellular communication network. The configuration-establisher and the data-obtainer comprise in such a case preferably a receiver arranged for receiving data from the cellular communications network.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

ABBREVIATIONS

AECID—Adaptive Enhanced Cell-ID
A-GPS—Assisted Global Positioning System
GPS—Global Positioning System
GSM—Global System for Mobile communications
LTE—Long-Term Evolution
OSS-RC—Operation and Support System-Radio and Core
OTDOA—Observed Time Difference Of Arrival
RAB—Radio Access Bearer
RAN—Radio Access Network
RANAP—Radio Access Network Application Part
RBS—Radio Base Station
RNC—Radio Network Controller
RRC—Radio Resource Control
RTT—Round Trip Time
SMLC—Service Mobile Location Centre
TA—Timing Advance
UE—User Equipment
WCDMA—Wideband Code Division Multiple Access

APPENDIX A

Clustering

The high precision measurements are normally obtained expressed in the WGS 84 geographical reference system. The measurements that are available at time t are denoted:

$$(\text{lat}_j(t_j)\text{long}_j(t_j))^T, j=1,\ldots,N(t), \quad (A1)$$

where $\text{lat}_j(t_j)$ and $\text{long}_j(t_j)$ denote the measured latitude and longitude, respectively, at the time $t_j$. N(t) denotes the total number of available measurements at time t.

At the same time $t_j$ (to within some reasonable accuracy in time), the active set is sampled for cell identities. The result is the row vector (or pointer):

$$\text{ActiveSet}(t_j)=(cID_1(t_j)cID_2(t_j)\ldots cID_{n(t_j)}(t_j)), \quad (A2)$$

where $cID_l(t_j)$ is the cell identity of the l:th strongest cell in softer handover, for the UE for which high precision positioning was performed at time $t_j$. $N(t_j)$ is the number of cells in the active set at time $t_j$.

An arbitrary possible pointer used for clustering of measurements, defined according to (A2), is now denoted by:

$$\text{Pointer}_k=(\text{Index}_l(k)\ldots\text{Index}_{N(k)}(k)), k=1,\ldots,K \quad (A3)$$

where $\text{Index}_l(k)$ is the l:th component of the (fix) pointer k, N(k) is the dimension of the pointer k and K is the number of counters. The corresponding list of high precision position measurements is denoted by $\text{List}_k$. At time t:

$$List_k(t) = \begin{pmatrix} lat_{k,1}(t_{k,1}) & lat_{k,2}(t_{k,2}) & \cdots & lat_{k,M(k,t)}(t_{k,M(k,t)}) \\ long_{k,1}(t_{k,1}) & long_{k,2}(t_{k,2}) & \cdots & long_{k,M(k,t)}(t_{k,M(k,t)}) \\ t_{k,1} & t_{k,2} & \cdots & t_{k,M(k,t)} \end{pmatrix}, \quad (A4)$$

where M(k,t) denotes the number of high precision measurements of list k at time t. As stated above, measurements that are older than a pre-specified threshold are discarded from each list. The maximum size of a list can also be pre-specified, in which case the oldest measurement is discarded irrespective of its age when a new measurement arrives.

When a new high precision measurement and corresponding active set is obtained at time $t_{N(t)+1}$ the clustering algorithm operates as follows:

```
For k =1 to K
    If Pointer_k = ActiveSet(t_{N(k)+1})
```
$$List_k(t_{N(k)+1}) = \left( List_k(t) \begin{pmatrix} lat_{N(t)+1}(t_{N(t)+1}) \\ long_{N(t)+1}(t_{N(t)+1}) \\ t_{N(t)+1} \end{pmatrix} \right)$$
```
    end
    else
        do nothing
    end
end
```

Polygon Computation

Notation

In order to facilitate an effective algorithmic description, the following notation is needed:

$p=(p_1 \ldots p_N)$—one specific pointer, corresponding to a specific ordered active set.

$r_{i,ll}^p = (x_{i,ll}^p y_{i,ll}^p)^T$, $=1, \ldots, N_p$—the polygon corners corresponding to the active set p in WGS 84 latitude longitude notation.

$r_i^p = (x_i^p y_i^p)^T$, $i=1, \ldots, N_p$—the polygon corners corresponding to the active set p in a local earth tangential Cartesian coordinate system, with the origin somewhere in the coverage area of the cellular system. Coordinate axes are usually east and north, disregarding the altitude. See e.g. [2] and the references therein for details on coordinate systems.

$r_{j,ll}^{m,p} = (x_{j,ll}^{m,p} y_{j,ll}^{m,p})$, $j=1, \ldots, N_p^m$—the high precision measurements used in order to determine the corners of the polygon corresponding to the active set p. Note that this measurements corresponds to one of the entries of $List_k$ that corresponds to p.

$r_j^{m,p} = (x_j^{m,p} y_j^{m,p})$, $j=1, \ldots, N_p^m$—the high precision measurements used in order to determine the corners of the polygon corresponding to the active set p. The high precision measurements are transformed to the same local earth tangential Cartesian coordinate system, with the origin somewhere in the coverage area of the cellular system, which is used above.

$C^p$—The specified confidence of the polygon corresponding to p. This value corresponds to the probability that the UE is located within the polygon, when the active set corresponds to p.

$A^p$—The area of the polygon corresponding to p.

$P^p$—The region defined by the polygon.

Coordinate Transformations

The procedure starts by a transformation of all high precision measurements corresponding to p to the local earth tangential Cartesian coordinate system, in which all computations are performed. Only the new measurements, which have not already been transformed need to be processed. See [2] and the references therein for details on this standard coordinate transformation.

Constrained Cell Area Minimization Problem

The principle behind the computation of the polygon is governed by the following three ideas:

The area of the polygon should be as small as possible, thereby maximizing the accuracy.

The constraint of the confidence value should be maintained, for the high precision measurements available.

Basic geometrical constraints on the polygon should be maintained, in particular the requirement that the polygon should not be allowed to intersect itself, and that the last numbered corner point is connected to the first (closedness).

The following minimization problem can then be set up for the computation of the corners of the polygon:

$$\{\hat{r}_1^p, \ldots, \hat{r}_{N_p}^p\} = \underset{r_1^p, \ldots, r_{N_p}^p}{\operatorname{argmin}} A^p(r_1^p, \ldots, r_{N_p}^p) \quad (A5)$$

subject to polygonial geometric constraints and $$\sum_{\substack{j=1 \\ r_j^{m,p} \in P^p}}^{N_p^m} 1 \geq C^p N_p^m.$$

This is a nonlinear optimization problem. Many methods that may be applicable to the solution of (A5), have been developed over the years. Here a new algorithm is disclosed, that is based on a direct approach, adapted to the problem at hand.

Contracting Polygon Algorithm

The main idea of this algorithm is to start with an initial polygon that contains all the high precision measurements collected for the particular active set. The initial polygon can e.g. be calculated from the center of gravity of the high precision measurements, followed by a calculation of the maximum distance from this center of gravity, for all high precision measurements. This defines a circle that contains all high precision measurement points. The initial polygon is then selected to contain this circle.

Following this initial step, the area of the polygon is then reduced in steps, by movement of one selected corner point of the polygon inwards towards the momentary center of gravity, so that one high precision measurement point is eliminated from the interior of the polygon, for each step. The area reduction is performed so that the area reduction, at each step, is maximized, at the same time as the constraints are maintained fulfilled.

The resulting algorithm is described below. The algorithm is described in terms of a number of operations that are first explained in subsections.

Center of Gravity

Since the high precision measurements are treated as points (non-stochastic), the center of gravity is the arithmetic mean, i.e.:

$$r_{CG} = (x_{CG} \ y_{CG}) = \frac{1}{N_p^{m,rem}} \sum_{q=1}^{N_p^{m,rem}} (x_q^{m,p,rem} \ y_q^{m,p,rem})^T, \quad (A6)$$

where the superscript $^{rem}$ indicates high precision measurements that have not yet been removed from the interior of the contracting polygon by the contracting polygon algorithm.

Initiation

Since the initiation of the algorithm only affects the $N_p$ first steps of the algorithm, a conservative approach is taken here. The firsts step is to compute the maximum distance from the center of gravity, i.e.:

$$j_{max}^p = \max_j \sqrt{(x_j^{m,p} - x_{CG})^2 + (y_j^{m,p} - y_{CG})^2} \quad (A7)$$

$$r^p = \sqrt{(x_j^{m,p} - x_{CG})^2 + (y_j^{m,p} - y_{CG})^2}. \quad (A8)$$

Hence all high precision measurements are now within a distance r' of the center of gravity. Note that if a finite number of polygon corner points would be spread out around this circle, there is no guarantee that the polygon contains all high precision measurement points.

Figure 7:
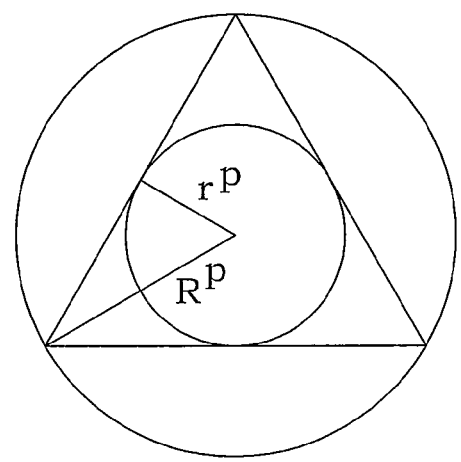
FIG. 7 illustrates an initiation geometry in an area association procedure.

Since initial points, symmetrically spread around a circle, is attractive, an additional outer circle is determined, such that it contains the simplest polygon with three corners that contains the circle with radius $r^p$, see FIG. 7. The initial polygon corner points can then be spread out around this outer circle with radius $R^p$. It is geometrically obvious that the largest outer circle is obtained for a polygon defined by the minimum amount of corners, 3.

The outer radius can now be related to the computed inner radius by consideration of FIG. 7. Geometrical symmetry shows that:

$$R^p = \frac{r^p}{\sin(30)} = 2r^p. \quad (A9)$$

The initial polygon corner points $\{r_i^{p,0}\}_{i=1}^{N_p}$ can then be distributed around the outer circle according to:

$$x_i^{p,0} = x_{CG} + R^p \cos\left(360 \frac{(i-1)}{N_p}\right) \quad (A10)$$

$$y_i^{p,0} = y_{CG} + R^p \sin\left(360 \frac{(i-1)}{N_p}\right). \quad (A11)$$

Other strategies are of course also possible.

Maximum Corner Movement

Note that the computations described in this subsection consider high precision measurement points the remains in the interior of the contracting polygon, at each iteration step. This is true for (A12)-(A21) and for (A24)-(A26).

Movement with Respect to High Precision Measurement Points

In order to assess which polygon corner that is most beneficial to move inwards at a given iteration step, it is first necessary to determine what the maximum movement is. This needs to take two constraints into account:

The second high precision point that leaves the polygon when a specific corner point is moved inward along the specified direction towards the center of gravity constrains the movement inwards. This requires a search over all high precision measurement points that remain inside the polygon at the specific iteration step of the algorithm.

The first polygon line segment that is intersected when a specific corner point is moved inward along the specified direction towards the center of gravity constrains the move inwards. This requires a search over all line segments (between polygon corner points) of the polygon.

Both these constraints need to be checked. Together they determine the inward maximum movement.

Figure 8:
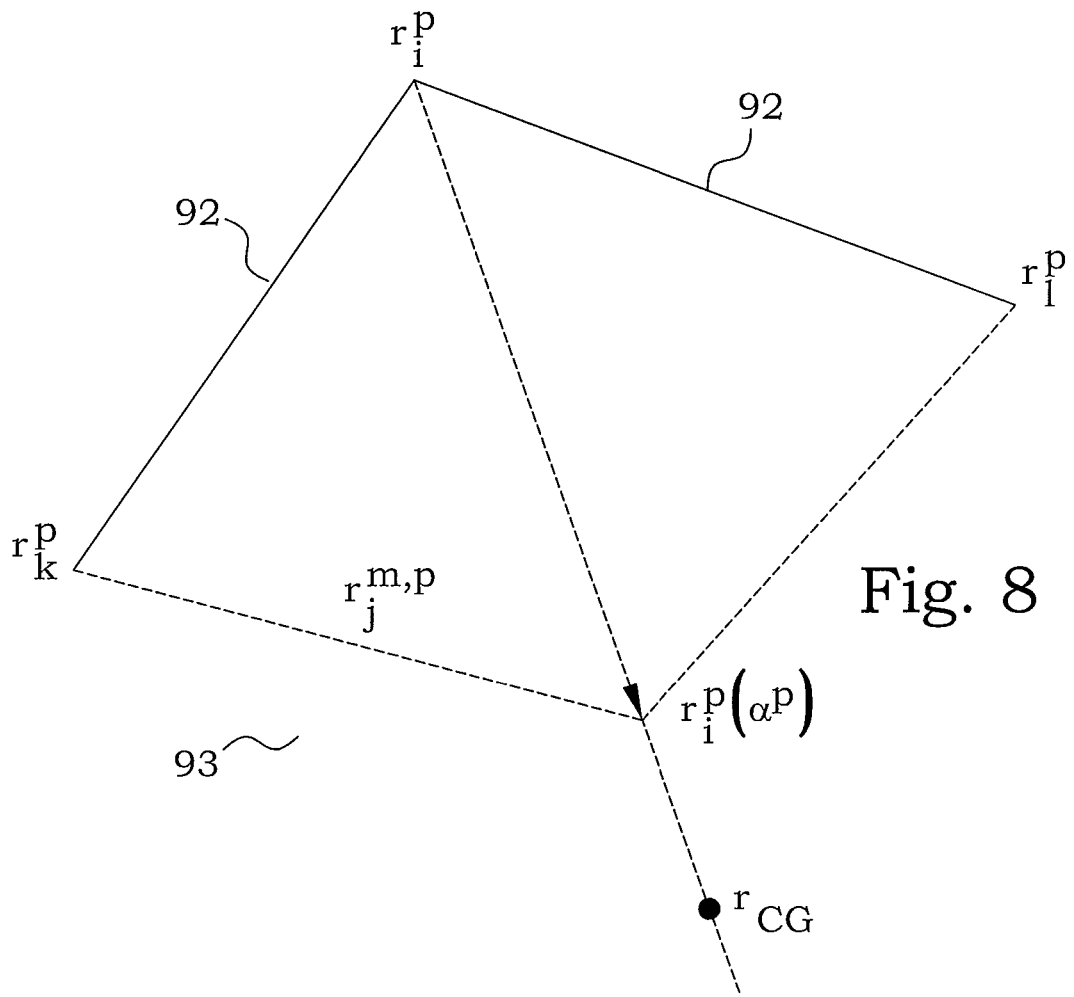
FIG. 8 illustrates a geometry for determining a maximum polygon corner movement.

The maximum polygon corner movement with respect to a specific high precision measurement point can be determined as follows, referring to FIG. 8. That figure shows a situation with three adjacent polygon corners $r_k^p$, $r_i^p$, $r_l^p$. The arbitrary numbering is due to the need to cover up for the fact that the last and the first of the polygon corner points are connected. The initial polygon boundary is denoted as 92 and the interior of the polygon as 91.

The middle point $r_i^p$ is then moved inwards towards the center of gravity. As a consequence the line segments that connect $r_k^p$ and $r_i^p$, as well as $r_i^p$ and $r_l^p$ also move. At some point of the movement the considered high precision measurement point may be intersected by either of these two line segments—both needs to be checked.

In order to determine a tentative point of intersection the movement of $r_i^p$ is computed to be:

$$r_i^p(\alpha^p) = r_i^p + \alpha^p(r_{CG} - r_i^p) \quad (A12)$$

Here $\alpha^p$ is a scalar parameter that varies between 0 and 1 when $r_i^p(\alpha)$ moves between $r_i^p$ and $r_{CG}$. Note that this is a standard way to describe a line segment mathematically. Note also that movement may in this case extend beyond the center of gravity.

A necessary (but not sufficient) requirement for an intersection of the moving boundary of the polygon with the considered high precision measurement point is that $r_i^p(\alpha^p) - r_k^p$ and $r_j^{m,p} - r_k^p$ become parallel or that $r_i^p(\alpha^p) - r_l^p$ and $r_j^{m,p} - r_l^p$ become parallel. By exploiting the fact that the cross product between parallel vectors is zero, allows for a computation of $\alpha^p$. Straightforward algebra gives the results:

$$\alpha_{ik}^{j,p} = \frac{-(x_i^p - x_k^p)(y_j^{m,p} - y_k^p) + (x_j^{m,p} - x_k^p)(y_i^p - y_k^p)}{(x_{CG} - x_i^p)(y_j^{m,p} - y_k^p) - (x_j^{m,p} - x_k^p)(y_{CG} - y_i^p)} \quad (A13)$$

$$\alpha_{il}^{j,p} = \frac{-(x_i^p - x_l^p)(y_j^{m,p} - y_l^p) + (x_j^{m,p} - x_l^p)(y_i^p - y_l^p)}{(x_{CG} - x_i^p)(y_j^{m,p} - y_l^p) - (x_j^{m,p} - x_l^p)(y_{CG} - y_i^p)}. \quad (A14)$$

The subscripts indicate the polygon corner points that define the line segment under evaluation. The superscript denotes the index of the high precision measurement point. Both (A13) and (A14) are candidates for being an active constraint. Note however, that a requirement for this is that:

$$\alpha_{ik}^{j,p} > 0 \quad (A15)$$

$$\alpha_{il}^{j,p} > 0 \quad (A16)$$

In case (A15) and (A16) do not hold, the corresponding intersection strategy needs to be discarded.

Assuming that (A15) and (A16) hold, it remains to check if the intersection point falls between the points that limit the line segment of the polygon. This means that the following equations need to be fulfilled, for some $\beta_{ik}^{j,p} \in [0,1]$ or $\beta_{il}^{j,p} \in [0,1]$:

$$r_j^{m,p} = r_i^p(\alpha_{ik}^{j,p}) + \beta_{ik}^{j,p}(r_k^p - r_i^p) \quad (A17)$$

$$r_j^{m,p} = r_i^p(\alpha_{il}^{j,p}) + \beta_{il}^{j,p}(r_l^p - r_i^p). \quad (A18)$$

Since the vectors leading to (A13) and (A14) are parallel, it is enough to consider one of the coordinates of (A17) and (A18) when solving for $\beta^p$. The results are:

$$\beta_{ik}^{j,p} = \frac{x_j^{m,p} - x_i^p(\alpha_{ik}^{j,p})}{x_k^p - x_i^p(\alpha_{ik}^{j,p})} \quad (A19)$$

$$\beta_{il}^{j,p} = \frac{x_j^{m,p} - x_i^p(\alpha_{il}^{j,p})}{x_l^p - x_i^p(\alpha_{il}^{j,p})}. \quad (A20)$$

The final logic needed in the evaluation of the point $r_j^{m,p}$, with respect to the movement of $r_i^p$, can be briefly summarized as follows. Provided that:

$\alpha_{ik}^{j,p} > 0$ and $0 < \beta_{ik}^{j,p} < 1$, $\alpha_{ik}^{j,p}$ represents a feasible maximum movement for the line segment between $r_i^p$ and $r_k^p$.

$\alpha_{ik}^{j,p} > 0$ and $\beta_{ik}^{j,p} > 1 \vee \beta_{ik}^{j,p} < 0$, $\alpha_{ik}^{j,p}$ represents an inward point but the feasible maximum movement is not relevant since the intersection is outside the line segment between $r_i^p$ and $r_k^p$. In this case the inward movement shall not limit the minimum allowed inward movement. This is accomplished by setting $\alpha_{ik}^{j,p} = \alpha_{max}$, where $\alpha_{max}$ is a large inward movement, say 10.

$\alpha_{ik}^{j,p} < 0$ and $0 < \beta_{ik}^{j,p} < 1$, $\alpha_{ik}^{j,p}$ represents a feasible maximum movement for the line segment between $r_i^p$ and $r_k^p$. However, since it is an outward movement, it shall be set to zero since the algorithm is designed for inward movement.

$\alpha_{il}^{j,p} > 0$ and $0 \beta_{il}^{j,p} < 1$, $\alpha_{il}^{j,p}$ represents a feasible maximum movement for the line segment between $r_i^p$ and $r_k^p$.

$\alpha_{il}^{j,p} > 0$ and $\beta_{il}^{j,p} > 1 \vee \beta_{il}^{j,p} < 0$, $\alpha_{il}^{j,p}$ represents an inward point but the feasible maximum movement is not relevant since the intersection is outside the line segment between $r_i^p$ and $r_k^p$. In this case the inward movement shall not limit the minimum allowed inward movement. This is accomplished by setting $\alpha_{il}^{j,p} = \alpha_{max}$, where $\alpha_{max}$ is a large inward movement, say 10.

$\alpha_{il}^{j,p} < 0$ and $0 < \beta_{il}^{j,p} < 1$, $\alpha_{il}^{j,p}$ represents a feasible maximum movement for the line segment between $r_i^p$ and $r_k^p$. However, since it is an outward movement, it shall be set to zero since the algorithm is designed for inward movement.

In case both $\alpha_{ik}^{j,p}$ and $\alpha_{il}^{j,p}$ are feasible maximum movements, the smallest one is chosen.

$$\alpha_i^{j,p} = \quad (A21)$$

$$\begin{cases} \alpha_{max}, & \alpha_{ik}^{j,p} < 0, \alpha_{il}^{j,p} > 0, \beta_{ik}^{j,p} \notin [0,1], \beta_{il}^{j,p} \notin [0,1] \\ \alpha_{il}^{j,p} & \alpha_{ik}^{j,p} < 0, \alpha_{il}^{j,p} > 0, \beta_{ik}^{j,p} \notin [0,1], \beta_{il}^{j,p} \in [0,1] \\ \alpha_{max} & \alpha_{ik}^{j,p} < 0, \alpha_{il}^{j,p} > 0, \beta_{ik}^{j,p} \in [0,1], \beta_{il}^{j,p} \notin [0,1] \\ \alpha_{il}^{j,p} & \alpha_{ik}^{j,p} < 0, \alpha_{il}^{j,p} > 0, \beta_{ik}^{j,p} \in [0,1], \beta_{il}^{j,p} \in [0,1] \\ \alpha_{max} & \alpha_{ik}^{j,p} > 0, \alpha_{il}^{j,p} < 0, \beta_{ik}^{j,p} \notin [0,1], \beta_{il}^{j,p} \notin [0,1] \\ \alpha_{max} & \alpha_{ik}^{j,p} > 0, \alpha_{il}^{j,p} < 0, \beta_{ik}^{j,p} \notin [0,1], \beta_{il}^{j,p} \in [0,1] \\ \alpha_{ik}^{j,p} & \alpha_{ik}^{j,p} > 0, \alpha_{il}^{j,p} < 0, \beta_{ik}^{j,p} \in [0,1], \beta_{il}^{j,p} \notin [0,1] \\ \alpha_{ik}^{j,p} & \alpha_{ik}^{j,p} > 0, \alpha_{il}^{j,p} < 0, \beta_{ik}^{j,p} \in [0,1], \beta_{il}^{j,p} \in [0,1] \\ \alpha_{max} & \alpha_{ik}^{j,p} > 0, \alpha_{il}^{j,p} > 0, \beta_{ik}^{j,p} \notin [0,1], \beta_{il}^{j,p} \notin [0,1] \\ \alpha_{il}^{j,p} & \alpha_{ik}^{j,p} > 0, \alpha_{il}^{j,p} > 0, \beta_{ik}^{j,p} \notin [0,1], \beta_{il}^{j,p} \in [0,1] \\ \alpha_{ik}^{j,p} & \alpha_{ik}^{j,p} > 0, \alpha_{il}^{j,p} > 0, \beta_{ik}^{j,p} \in [0,1], \beta_{il}^{j,p} \notin [0,1] \\ \min(\alpha_{ik}^{j,p}, \alpha_{il}^{j,p}) & \alpha_{ik}^{j,p} > 0, \alpha_{il}^{j,p} > 0, \beta_{ik}^{j,p} \in [0,1], \beta_{il}^{j,p} \in [0,1] \\ 0 & \text{otherwise} \end{cases}$$

Note that some of the listed cases may never occur. This is of less consequence in case the computations are implemented in a consecutive way, following the order of presentation of this document.

Movement with Respect to Polygon Line Segments

The intersection between the line of movement as given by (A12), and the line segment between $r_m^p$ and $r_n^p$, is given by the solution to the following system of equations, which is solved with respect to the parameters $\alpha_{i,mn}^p$ and $\gamma_{mn}^p$, where the subscript refer to the points involved in the computation $$r_i^p + \alpha_{i,mn}^p(r_{CG} - r_i^p) = \quad (A22)$$

$$r_m^p + \gamma_{mn}^p(r_n^p - r_m^p) \Leftrightarrow ((r_{CG} - r_i^p) - (r_n^p - r_m^p)) \begin{pmatrix} \alpha_{i,mn}^p \\ \gamma_{mn}^p \end{pmatrix} = r_m^p - r_i^p.$$

The solution shall not be computed for the points adjacent to $r_i^p$. Furthermore, the intersection between the two lines falls outside the relevant line segment between $r_m^p$ and $r_n^p$ in case $\gamma_{mn}^p \notin [0,1]$. If this is the case the intersection shall be disregarded in the evaluation of the corner $r_i^p$. The requirement that $\alpha_{i,mn}^p > 0$ also remains. Note also that it is only needed to solve (A22) once for each corner point and iteration step of the algorithm.

To obtain the complete picture, (A22) is first solved for all line segments, excluding the ones that are adjacent to $r_i^p$. The solution with the minimum value of $\alpha_{i,mn}^p$, such that $\alpha_{i,mn}^p > 0$ and $\gamma_{mn}^p \in [0,1]$, is expressed as (note that since the movement is inward such a solution always exists)

$$\alpha_{i,m_0 n_0}^p, \gamma_{i,m_0 n_0}^p \quad (A23)$$

Combination

Since all high precision measurement points are evaluated along the same direction as far as constraints are concerned, they can be directly combined. Note also that since one point is to be removed from the interior of the polygon for each iteration step, the limiting high precision measurement point is to be selected as the second one that becomes active. The high precision measurement point that becomes an active constraint is hence given by (A24), where (A24) can be calculated as follows:

$$j_{first} = \underset{\substack{j \\ r_j^{m,p} \in P^p}}{\arg\min} \alpha_{i,j,p} \quad (A24)$$

$$j_{activeConstraint} = \underset{\substack{j \neq j_{firts} \\ r_j^{m,p} \in P^p}}{\arg\min} \alpha_{i,j,p}.$$

The corresponding movement becomes $$\alpha_i^{p,measurementConstraints} = \alpha_i^{j_{activeConstraint},p}. \quad (A25)$$

The Result (A25) is Finally Combined with the Constraint Imposed by the possibility of self-intersection:

$$\alpha_i^{p,allConstraints} = \min(\alpha_i^{p,measurementConstraints}, \alpha_{i,m_0n_0}^p) - \in, \quad (A26)$$

where $\in$ is a small number that prevents that the constraint becomes exactly active, so that the search is started outside the constraining point in the next iteration step.

Obtained Polygon Area Reduction

Figure 9:
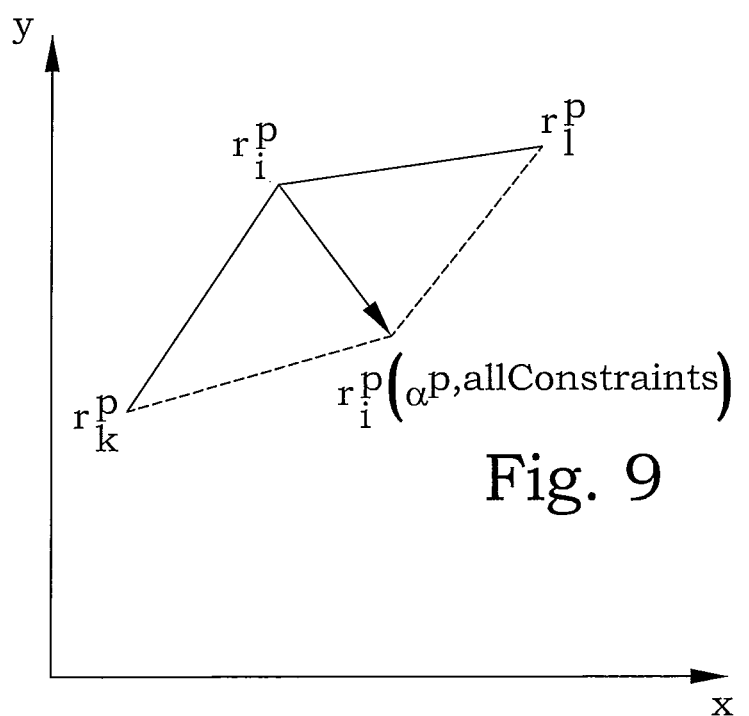
FIG. 9 illustrates a geometry for calculation of the area reduction.

The obtained are reduction follows by integration, or equivalently, computation of the areas under the parts of the polygon showed in FIG. 9.

By consideration of the facts that:
the area under the curve can be computed as sums of areas of rectangles and triangles.
It is only the areas related to the moving and adjacent points that are affected by the movement,
it follows that the areas before and after movement can be expressed as $$A_{i,before}^p = A_0 + \tfrac{1}{2}(x_i^p - x_k^p)(y_k^p - y_i^p) + \tfrac{1}{2}(x_i^p - x_i^p)(y_i^p + y_i^p) \quad (A27)$$

$$A_{i,after}^p = A_0 + \tfrac{1}{2}(x_i^p(\alpha_i^{p,allConstraints}) - x_k^p)(y_k^p + y_i^p(\alpha_i^{p,allConstraints})) + \tfrac{1}{2}(x_i^p - x_i^p(\alpha_i^{p,allConstraints}))(y_i^p(\alpha_i^{p,allConstraints}) + y_i^p). \quad (A28)$$

The reduction of area obtained is hence given by $$\Delta A_i^{p,allConstraints} = |\tfrac{1}{2}(x_i^p - x_k^p)(y_k^p + y_i^p) + \tfrac{1}{2}(x_i^p - x_i^p)(y_i^p - x_i^p)(y_i^p + y_i^p) - -\tfrac{1}{2}(x_i^p(\alpha_i^{p,anConstraints}) - x_k^p)(y_k^p + y_i^p(\alpha_i^{p,allConstraints})) - \tfrac{1}{2}(x_i^p - x_i^p(+_i^{p,allConstraints}))(y_i^p(\alpha_i^{p,allConstraints}) + y_i^p)|. \quad (A29)$$

The maximum of this are reduction measure determines which corner to move, whereas (A12) and (A26) determine the movement.

The Algorithm

In the algorithm below $N_p^{m,rem}$ denotes the number of high precision measurement points that remain in the interior of the polygon, at each corner movement iteration step. The algorithm for polygon computation, for one specific active set p is then:

Initialization:
Compute the center of gravity of all high precision measurements of the cluster (A6).
Compute the maximum distance r from the center of gravity (A7), (A8).
Compute the initial polygon distributed around the circle R (A9), (A10), (A11).
Area minimization:
1. Repeat until $N_p^{m,rem} < C^p N_p^m$ or $\alpha_i^{p,allConstraints} \leq 0$ (Measurement removal loop).
   a. Compute the center of gravity for the points that remain in the interior of the polygon (A6).
   b. For i=1 to $N_p$ (Corner movement evaluation loop).
      i. For j=1 to $N_p^{m,rem}$ (Measurement point constraint evaluation loop).
         A. Compute and store allowed, point-wise constrained, corner movement (A21).
         ii. End (Measurement point constraint evaluation loop).
      iii. Compute and store allowed combined, measurement constrained, movement (A24), (A25).
      iv. Compute and store allowed, self-intersection constrained, movement (A23).
      v. Compute and store combined allowed, measurement and self-intersection constrained, movement (A26).
      vi. Compute and store area reduction (A29), corresponding to (A26).
   c. End (Corner movement evaluation loop).
   d. Find the corner with index $i_0$ corresponding to the maximum area reduction.
   e. Update (A12) the corner $i_0$ with the movement $\alpha_{i_0}^{p,allConstraints}$.
   f. Remove the point high precision measurement point that is no longer in the interior of the polygon, from any lists of interior points.
   g. $N_p^{m,rem} := N_p^{m,rem} - 1$;
2. End (Measurement removal loop).
3. Transform the final corner points of the polygon to WGS 84c latitudes and longitudes.

The invention claimed is:

1. A method for providing position determination assisting data for adaptive enhanced cell-ID positioning purposes in a cellular communications network, comprising:
   for each of a plurality of times, establishing a cell relation configuration for a user equipment and performing a high-precision position determination for said user equipment;
   clustering results of different ones of said high-precision position determinations that belong to different cell relation configurations into separate clusters of results, wherein any given one of said clusters includes results of one or more of said high-precision position determinations that belong to the same cell relation configuration;
   associating an area definition with each of one or more of said clusters by:
      enclosing the results of the cluster within a polygon;
      shrinking said polygon by moving polygon corners towards a contraction point distinct from a total centre of gravity of all results of the cluster, wherein said contraction point is a local centre of gravity of a subset of the results of the cluster, said subset being a predetermined amount of those results of the cluster that are situated closest to a total centre of gravity of all results of the cluster, and wherein said contraction point is always selected to be situated in the interior of the cluster and is locally surrounded by individual results of the cluster; and
      defining the area definition associated with the cluster as a shrunk polygon comprising a predetermined fraction of the results of the cluster; and
   creating position determination assisting data comprising a relation between said cell relation configurations and said associated area definitions.

2. The method according to claim 1, wherein said contraction point is selected as a point within said polygon having a smallest distance to the n-th closest result of said cluster, where n is one of a predetermined number and a predetermined fraction of all results of the cluster.

3. The method according to claim 1, further comprising computing said contraction point before beginning to shrink said polygon.

4. The method according to claim 1, further comprising computing said contraction point intermittently while shrinking said polygon.

5. The method according to claim 1, further comprising computing said contraction point only if said total centre of gravity falls outside the interior of the results of the cluster.

6. The method according to claim 1, wherein the method is also for radio network planning, wherein said performing a high-precision position determination comprises performing said determination on demand, and wherein the method further comprises evaluating said position determination assisting data regarding actual radio propagation.

7. The method according to claim 1, wherein the method is also for determining a position of a particular user equipment in the cellular communications network, and further comprises:
   establishing a cell relation configuration for said particular user equipment; and
   determining, by said position determination assisting data, an area definition related to the cell relation configuration established for said particular user equipment as defining an area in which said particular user equipment is positioned.

8. A node associated with a cellular communications network operative to provide position determination assisting data for adaptive enhanced cell-ID positioning purposes, comprising:
   a configuration-establisher and a data-obtainer configured, for each of a plurality of times, to establish a cell relation configuration for a user equipment and to obtain data of a high-precision position determination for said user equipment;
   a clusterer connected to said configuration-establisher and said data-obtainer and configured to cluster results of different ones of said high-precision position determinations that belong to different cell relation configurations into separate clusters of results, wherein any given one of said clusters includes results of one or more of said high-precision position determinations that belong to the same cell relation configuration;
   an associator connected to said clusterer and configured to associate an area definition with each of one or more of said clusters and to create position determination assisting data for adaptive enhanced cell-ID positioning purposes, said data comprising a relation between said cell relation configurations and said associated area definitions, wherein the associator is configured to associate an area definition with a cluster by:
   enclosing the results of the cluster within a polygon;
   shrinking said polygon by moving polygon corners towards a contraction point distinct from a total centre of gravity of all results of the cluster, wherein said contraction point is a local centre of gravity of a subset of the results of the cluster, said subset being a predetermined amount of those results of the cluster that are situated closest to a total centre of gravity of all results of the cluster, and wherein said contraction point is always selected to be situated in the interior of the cluster and is locally surrounded by individual results of the cluster; and
   defining the area definition associated with the cluster as a shrunk polygon comprising a predetermined fraction of the results of the cluster.

9. The node according to claim 8, wherein the associator is configured to select said contraction point as a point within said polygon having a smallest distance to the n-th closest result of said cluster, where n is one of a predetermined number and a predetermined fraction of all results of the cluster.

10. The node according to claim 8, wherein the node is configured to determine a position of a particular user equipment in the cellular communications network, and further comprises:
    a second configuration-establisher configured to establish a cell relation configuration for said particular user equipment; and
    a position-determiner connected to said second configuration establisher and configured to determine, by said position determination assisting data, an area definition related to said cell relation configuration established for said particular user equipment as defining an area in which said particular user equipment is positioned.

11. The node according to claim 8, wherein the node is external to the cellular communications network, and wherein said configuration establisher and said data-obtainer comprise a receiver configured to receive data from the cellular communications network.

12. A cellular communications network comprising a node for providing position determination assisting data for adaptive enhanced cell-ID positioning purposes related to the cellular communications network, wherein the node comprises:
    a configuration-establisher and a data-obtainer configured, for each of a plurality of times, to establish a cell relation configuration for a user equipment and to obtain data of a high-precision position determination for said user equipment;
    a clusterer connected to said configuration-establisher and said data-obtainer and configured to cluster results of different ones of said high-precision position determinations that belong to different cell relation configurations into separate clusters of results, wherein any given one of said clusters includes results of one or more of said high-precision position determinations that belong to the same cell relation configuration;
    an associator connected to said clusterer and configured to associate an area definition with each of one or more of said clusters and to create position determination assisting data for adaptive enhanced cell-ID positioning purposes, said data comprising a relation between said cell relation configurations and said associated area definitions, wherein the associator is configured to associate an area definition with a cluster by:
    enclosing the results of the cluster within a polygon;
    shrinking said polygon by moving polygon corners towards a contraction point distinct from a total centre of gravity of all results of the cluster, wherein said contraction point is always selected to be situated in the interior of the cluster and is locally surrounded by individual results of the cluster; and
    defining the area definition associated with the cluster as a shrunk polygon comprising a predetermined fraction of the results of the cluster.

* * * * *

UNITED STATES PATENT AND TRADEMARK OFFICE
CERTIFICATE OF CORRECTION

PATENT NO. : 9,234,959 B2
APPLICATION NO. : 13/140238
DATED : January 12, 2016
INVENTOR(S) : Wigren It is certified that error appears in the above-identified patent and that said Letters Patent is hereby corrected as shown below:

In the specification

In Column 1, Line 53, delete "trilatheration" and insert -- trilateration --, therefor.

In Column 4, Line 60, delete "cluster" and insert -- cluster. --, therefor.

In Column 5, Line 51, delete "Trilatheration" and insert -- Trilateration --, therefor.

Column 11, Line 3, should read -- $B_{r_c} = \{(x \ y)^T \mid (x-x_c)^2 + (y-y_c)^2 \leq \delta\}$ --, therefor.

Column 12, Line 54, should read
-- $ActiveSet(t_j) = (cID_1(t_j) \ cID_2(t_j) \ ... \ cID_{N(t_i)}(t_j))$, --, therefor.

In Column 14, Line 27, delete "polygonial" and insert -- polygonal --, therefor.

Column 17, Line 54, should read -- $0 < \beta_{il}^{j,\mathbf{p}} < 1$, $\alpha_{il}^{j,\mathbf{p}}$ --, therefor.

Column 19, Lines 1-3, should read -- $$j_{first} = \arg\min_{\substack{j \\ \mathbf{t}_j^{m,\mathbf{p}} \in P^{\mathbf{p}}}} \alpha_i^{j,\mathbf{p}}$$ --, therefor.

Signed and Sealed this
Twenty-eighth Day of June, 2016

Michelle K. Lee
*Director of the United States Patent and Trademark Office*

CERTIFICATE OF CORRECTION (continued)
U.S. Pat. No. 9,234,959 B2

In the specification

Column 19, Lines 5-7, should read --
$$j_{activeConstraint} = \underset{\substack{j \neq j_{firts} \\ \mathbf{r}_j^{m,\mathbf{p}} \in P^{\mathbf{p}}}}{\arg\min} \alpha_i^{j,\mathbf{p}}$$
--, therefor.

Column 19, Lines 39-41, should read $$\Delta A_i^{\mathbf{p},allConstraints} = \left| \frac{1}{2}(x_i^{\mathbf{p}} - x_k^{\mathbf{p}})(y_k^{\mathbf{p}} + y_i^{\mathbf{p}}) + \frac{1}{2}(x_i^{\mathbf{p}} - x_l^{\mathbf{p}})(y_i^{\mathbf{p}} + y_l^{\mathbf{p}}) \right.$$
$$- \frac{1}{2}(x_i^{\mathbf{p}}(\alpha_i^{\mathbf{p},allConstraints}) - x_k^{\mathbf{p}})(y_k^{\mathbf{p}} + y_i^{\mathbf{p}}(\alpha_i^{\mathbf{p},allConstraints}))$$
$$\left. - \frac{1}{2}(x_l^{\mathbf{p}} - x_i^{\mathbf{p}}(\alpha_i^{\mathbf{p},allConstraints}))(y_i^{\mathbf{p}}(\alpha_i^{\mathbf{p},allConstraints}) + y_l^{\mathbf{p}}) \right|$$
--, therefor.

In Column 20, Line 20, delete "-1;" and insert -- -1. --, therefor.

In the claims

In Column 22, Line 57, in Claim 12, delete "point is always" and insert -- point is a local centre of gravity of a subset of the results of the cluster, said subset being a predetermined amount of those results of the cluster that are situated closest to a total centre of gravity of all results of the cluster, and wherein said contraction point is always --, therefor.